United States Patent Office 3,006,846
Patented Oct. 31, 1961

3,006,846
HYDROXYLATED ASPHALT AND DRILLING
FLUID CONTAINING THE SAME
Charles A. Stratton, Washington County, Okla., assignor to Phillips Petroleum Company, a corporation of Delaware
No Drawing. Filed Sept. 12, 1958, Ser. No. 760,563
19 Claims. (Cl. 252—8.5)

This invention relates to drilling fluids. In another aspect it relates to drilling fluids, such as the aqueous, oil-base, and emulsion types, used in drilling oil and gas wells, and other deep wells. In a further aspect it relates to a method of drilling wells with said drilling fluids, the latter being characterized by desirably low fluid loss, and other desirable rheological properties. In another aspect it relates to a method of preparing hydroxylated asphalt, which material is particularly suitable for use in drilling fluids. In a further aspect it relates to hydroxylated asphalt compositions and alkali metal derivatives thereof.

In the art of drilling wells to tap subterranean deposits, such as gas or oil, especially when drilling by the rotary method or the percussion method wherein cuttings must be removed from the bore hole, it is necessary to use a drilling fluid, as is well known to those skilled in the art. The especially prepared drilling fluid is pumped down a hollow drill string or stem within the bore hole, across the drill bit which is attached to the lower end of the drill stem, and is then normally circulated upwardly through the annular space between the drill stem and the bore hole. Circulation of the drilling fluid in this manner removes the cuttings from the bore hole, lubricates and cools the drill bit, seals the wall of the bore hole with a thin, impervious layer of solid material or filter cake, and applies a hydrostatic head to the formation to counter balance formation pressures.

In addition to having desirable rheological properties such as viscosity and gel strength, it is important that the drilling fluid exhibit a low rate of filtration or fluid loss, that is, the drilling fluid should permit little if any loss of its liquid phase to the formation penetrated, as is well known to those skilled in the art.

Accordingly, an object of this invention is to provide a novel drilling fluid. Another object is to provide a novel drilling fluid such as the aqueous, oil-base, or emulsion types, characterized by desirable fluid loss, viscosity, gel strength, and other desirable rheological properties. Another object is to provide an improved method of drilling oil and gas wells, or other deep wells, using a novel drilling fluid. Another object is to provide a method for preparing an alkali fused-sulfonated asphalt composition, particularly suitable for use in drilling fluids. Another object is to provide novel hydroxylated asphalt compositions and alkali metal derivatives thereof. Further objects, advantages, and features of this invention will become apparent to those skilled in the art from the following discussions and appended claims.

I have discovered that superior drilling fluids, such as the aqueous, oil-base, and emulsion types, can be prepared using the water- and/or oil-dispersible hydroxylated asphalt materials, such as those produced by the alkali fusion of sulfonated asphalt. The sulfonated asphalts themselves can be prepared by contacting asphalt with a sulfonating agent, such as fuming sulfuric acid or the like, neutralizing the resulting sulfonic acids and converting the same to the alkali metal salts. A preferred method for preparing these sulfonated asphalts is disclosed in co-pending application, Serial Number 726,047, filed April 3, 1958.

The term "asphalt" or "asphaltic material" as used in this specification and in the appended claims is meant to cover dark brown to black semi-solid or solid cementitious hydrocarbon material which is completely or substantially soluble in carbon disulfide, in which material bitumens are the sole or predominant constituent, these materials occurring in nature as such or being obtained by refining petroleum by distillation, precipitation, cracking, oxidation, or similar operations. The terms "sulfonates," "sulfonated asphalt," and "sulfonated asphaltic material" as used in this specification and appended claims are meant to cover the ammonium, alkali metal, and alkaline earth metal salts of asphalt that has been sulfonated with a sulfonation agent, such as oleum. Asphaltic materials useful in preparing the sulfonates representatively include asphaltenes, maltenes, blown asphalt, straight residual oils, distillation residues, still bottoms, cracking residues, asphaltic bitumens, and the like.

The terms "hydroxylated asphalt" and "alkali or caustic fused-sulfonated asphalt" as used in this specification and the appended claims are meant to cover those reaction products which can be prepared, for example, by the fusion of the aforementioned sulfonated asphalts with alkali or caustic, such as sodium hydroxide and potassium hydroxide.

In preparing the sulfonates, the asphaltic starting material can have a semi-solid or solid constituency and is preferably in a granulated, pulverized, or finely divided form. The asphaltic material can be preliminarily dissolved or dispersed in a suitable non-sulfonateable, non-aromatic, diluent such as carbon tetrachloride, chloroform, pentane, n-hexane, octanes, gasoline, kerosene, cyclohexane, diesel fuel, and the like. A particularly suitable diluent in many cases will be liquid sulfur dioxide. The diluent can be added serially to the asphaltic material before sulfonation and further amounts may be added after sulfonation. The diluent can be separated from the sulfonation mixture by distillation, simple warming or heating, or extraction with suitable non-polar solvents. In many cases the diluent need not be separated from the sulfonation mixture.

Sulfonation temperatures are usually controlled within the range of about 0 to 250° F., with the preferred operating range being between 32 and 100° F. Lower temperatures are somewhat preferred since above about 200° F. excessive oxidation with liberation of sulfur dioxide may take place. The asphalt-sulfonating agent weight ratio will vary with the sulfonation temperature and asphalt starting material, but generally will be in the range from 1:0.12 and 1:1. The sulfonation reaction is usually carried out at atmospheric pressure although pressures greater or less than atmospheric can be employed if desired.

Sulfonating agents which can be utilized in the sulfonation step include fuming sulfuric acid, chlorosulfonic acid, concentrated sulfuric acid, and sulfur trioxide. The fuming sulfuric acid can vary from about 10 to 40 weight percent excess $SO_3$; however, I prefer to use commercial fuming sulfuric acid which has about 20 weight percent excess $SO_3$, this type of fuming sulfuric acid being known as oleum.

In the preparation of the sulfonated asphalts, oleum and anhydrous $SO_3$ are the preferred sulfonating agents. The sulfonating agent is preferably added dropwise or in increments to the asphaltic material with stirring or agitation. The sulfonation reaction can be stopped by the addition of water to the reaction mixture.

As pointed out hereinbefore, in many cases it would be desirable to separate the diluent from the reaction mixture after the sulfonation step; this separation can be accomplished by distilling off the diluent, or it can be accomplished by extraction, simple heating, or stripping for example, with air. Prior to the neutralization of the resulting sulfonic acids, excess $SO_2$ can be removed from the reaction mixture in any convenient manner, for example, by simple warming or by stripping with air.

The sulfonation reaction mixture can then be directly neutralized or can first be preliminarily separated by filtration or the like into a sulfonic acid phase and a sludge phase containing unreacted starting material.

The sulfonic acids are neutralized by contacting them with anhydrous or aqueous ammonia, or an aqueous solution or slurry of an alkali or alkaline earth metal oxide, or hydroxide, thereby converting the sulfonic acids to the corresponding ammonium or metal sulfonates. Metals which are particularly suitable for preparing the sulfonates include the alkali metals such as sodium and potassium, and the alkaline earth metals such as magnesium, calcium, barium, and the like. The preferred sulfonates are the ammonium and sodium sulfonates.

The neutralization step can be conveniently carried out over a wide temperature range, e.g., 200–240° F., and at a pressure preferably sufficient to prevent evaporation of the volatile materials present. Repeated amounts of the neutralizing agent can be added so as to insure complete neutralization. Both before and after neutralization it is desirable in many cases to strip off any $SO_2$ remaining in the sulfonation mixture. In many cases it may be desirable to strip off the aforementioned diluent after the neutralization step, as mentioned hereinbefore. It is also feasible to use a combination of neutralizing agents; for example, the sulfonic acids can be neutralized with first anhydrous ammonia and then sodium hydroxide, or first sodium hydroxide and then anhydrous ammonia. After neutralization, the pH of the neutralized mixture can be adjusted, for example by adding concentrated sulfuric acid.

After the neutralization step, the neutralized mixture can be allowed to settle and then separated, for example, by decantation, centrifugation, filtration, or the like, to separate the sulfonates from sludge or other unreacted material. In some cases, depending upon the particular starting material utilized, the sulfonation and neutralization can be carried out under substantially dry or anhydrous conditions. The resultant sulfonate product can then be dried.

Following the preparation of the sulfonated asphalt, the latter is then fused with an alkali. Representative alkalis which can be used include caustics such as sodium and potassium hydroxide. The sulfonated asphalt to be fused is preferably dry and comminuted or ground and dry mixed, for example in the Waring Blendor, with the caustic. The amount of caustic employed in preparing the hydroxylated asphalt products of this invention will generally be in the range of from about 1 to 2 mols per mol of sulfonated asphalt, although lesser amounts, e.g., as low as 0.5 mol, of caustic can be used. The dry admixture of sulfonated asphalt and caustic is preferably mixed along with a small amount of water to render the material more easily fusible. The resulting mixture of reactants is then heated and stirred to effect fusion. This reaction can be carried out at atmospheric pressure although preferably it is carried out under pressure in a suitable closed protective metal case or pressure bomb. The fusion or reaction temperature can vary over a wide range, depending upon the degree of fusion desired, and generally will be within the range of 302 to 752° F., more preferably in the range of 554 to 664° F. The fusion or reaction can be carried out for a suitable length of time, for example from a few minutes to several hours. The resulting reaction mixture is then cooled, and the pH can be adjusted by dispersing the reaction mixture in water and adding a suitable neutralization material, such as by bubbling $CO_2$ into the resulting solution. The cooled, neutralized reaction mixture can then be evaporated to dryness and/or dried in a vacuum oven, and then ground to a suitable particle size. The resulting product, an alkali fused-sulfonated asphalt or alkali metal derivative of hydroxylated asphalt, can then be added to water or a suitable oil so as to disperse the same, and then utilized in drilling fluids. Alternatively, the alkali metal derivative can be converted to the free hydroxylated asphalt, for example, by mixing with ice and an acid, such as hydrochloric acid.

The resulting hydroxylated asphalt and derivatives thereof used in the practice of this invention have chemical natures which are very difficult to accurately ascertain due to the complexity of the asphaltic starting material. The source of the asphaltic starting material is one of the several variables which determine the chemical nature of the sulfonated asphalt and the resulting fused alkali product thereof. The fused sulfonated asphalt products of this invention have a wide range of dispersibility in water and oil and these materials will form true solutions, colloidal and supercolloidal suspensions, and suspensions in which the hydroxylated asphalts are relatively insoluble though finely divided and dispersible. While the exact nature of the fusion reaction or treatment is not known, it is believed that sulfonic groups are split off, i.e., the sulfonate group $—SO_3Na$ is replaced by the $—ONa(K)$ group; conversion to the free hydroxylated asphalt results from the replacement of the $—ONa(K)$ group by the $—OH$ group.

In the drilling fluids prepared according to this invention, the hydroxylated asphalt or alkali metal derivatives thereof are dispersed in either the aqueous or oil phase. As mentioned hereinbefore, the drilling fluids prepared according to this invention and containing the aforementioned hydroxylated asphalt, have desirable rheological properties, notably viscosity and fluid loss. Furthermore, the drilling fluids of this invention are capable of taking up a considerable proportion of the finely divided bit cuttings or drilling solids without adverse effect on the properties of the drilling fluids.

The drilling fluids of this invention can be prepared by any conventional method. The amount of hydroxylated asphalt, water, and oil employed are dependent upon several variables, such as the nature of the hydroxylated asphalt itself, the density of the drilling fluid desired, the nature of the formation penetrated, and other factors that can be readily determined by those skilled in the art upon being acquainted with this invention. It has long been customary in rotary well drilling operations to subject the drilling fluid to simple routine tests from time to time, and these tests are sufficient to indicate the relative amounts of hydroxylated asphalt, water, or oil to be employed. Generally, the amount of hydroxylated asphalt, employed will be sufficient to form a relatively thin, impervious filter cake on the wall of the well, and in an amount that will impart a sufficiently low viscosity to the drilling mud in order that it may readily be pumped and circulated. In general, the amount of hydroxylated asphalt added to the drilling fluid will be in the range from about 0.1 to about 10 pounds per barrel (42 U.S. gallons) of drilling fluid.

For water-in-oil emulsion systems, the amount of water to be employed would generally range from as low as 1 percent by weight of the final drilling fluid to 60 percent by weight, and preferably less than 40 percent by weight. For oil-in-water emulsion systems, the amount of water will be in the range from about between 99 to 60 percent by weight of the final emulsion and the amount of oil will be in the range from 1 to 40 percent by weight of the final emulsion.

The oil component used in preparing the oil-base and emulsion drilling fluids of this invention can be any hydrocarbon normally used for this purpose in the art, such as diesel fuel, crude oil, kerosene, gas oil, heavy fuel oil, various petroleum fractions, and the like.

Although the drilling fluids of this invention need only contain a fluid medium, such as water and/or oil, and the water-dispersible and/or oil-dispersible hydroxylated asphalt as the material necessary to obtain desirable rheological properties, especially low fluid loss, it is within the scope of this invention to add clays or other finely divided inorganic solids. In addition, materials commonly used for weighting purposes can be added, including finely divided limestone, barite, lead sulfide, oyster shell, or the like. For emulsion systems any suitable conventional emulsifying agent, such as the alkaline earth metal salts of saponifiable oils such as vegetable oils, wood oils, fish oils and the like, can be employed. Other applicable emulsifying agents include dresinates, alkali and alkaline earth metal salts of lignin, metal salts of carboxy methyl cellulose, and the like. In general, the emulsion drilling fluids prepared according to this invention are relatively stable type emulsions.

The following examples and discussion are illustrative of this invention and specific details for preparing the hydroxylated asphalt and drilling fluids of this invention are merely illustrative of preferred embodiment thereof and are not to be construed as unduly limiting this invention.

EXAMPLE I

A hydroxylated asphalt was prepared in the following manner, the starting material being a cracked asphalt obtained from a secondary vacuum tower of a cracking unit and having a specific gravity of 1.88 at 60° F., a penetration of 0 at 77° F. (100 gram weight, 5 secs.) and a ring and ball softening point of 205° F. 300 g. of the crushed, cracked asphalt dissolved in about 1500 ml. liquid sulfur dioxide at a temperature below about 14° F. 100 ml. of anhydrous $SO_3$ were added dropwise with stirring over a period of one hour and stirring was continued 30 minutes after the last addition of $SO_3$. The $SO_2$ was allowed to evaporate as the reaction mixture came to room temperature. The resulting sulfonation mixture was then neutralized by blowing the same with anhydrous ammonia. The resulting neutralized sulfonated cracked asphalt was then ground to pass a No. 30 sieve.

33 gms. of the ground sulfonated cracked asphalt were added to a pressure bomb and 32 ml. of aqueous sodium hydroxide (containing 8 gms. of sodium hydroxide) were added to the bomb and the contents heated and stirred until ammonia was driven off. The pressure bomb was then sealed and heated in an oven for 3½ hours at 356° F. The pressure bomb and contents were then cooled and the contents were then poured into a Waring Blendor together with sufficient water to bring the total volume to 225 ml. The resulting aqueous dispersion of the sodium derivative of hydroxylated asphalt was then blended, the mixture containing about 15 weight percent of the hydroxylated asphalt.

The aforementioned aqueous dispersion of hydroxylated asphalt was in effect a water-base drilling fluid and the properties thereof were determined according to "Recommended Practice on Standard Field Procedures for Testing Drilling Fluids," API Code No. 29. The excellent water or fluid loss properties of this drilling fluid as set forth in Table I.

*Table I*

| Temperature | Water Loss |
| --- | --- |
| Room temperature | 3.2 ml. in 30 minutes. |
| 250° F | 10 ml. in 30 minutes. |
| 320° F | 21.2 ml. in 30 minutes. |

EXAMPLE II

Hydroxylated asphalt samples were made from a sulfonated asphalt prepared on pilot plant scale in the following manner. To a refrigerant-jacketed open kettle was charged 24 gals. of n-hexane. This kettle also had a steam coil of ⅜" steel tube in the bottom and was fitted with an air-driven stirrer. The n-hexane in the kettle was initially heated to 150° F., and to the heated solvent was added 40 pounds of residual asphaltic product obtained from a third stage vacuum tower which had been charged with 100% West Texas—New Mexico crude oil, the residual product being in the form of particles or chunks up to about 2½" diameter. The temperature of the resulting mixture was held at the boiling point of n-hexane (157° F.) for one hour and fifteen minutes; thereafter the mixture was allowed to cool overnight. Upon investigation, it was found that the residual product was not completely dissolved and so the contents of the kettle were repeatedly heated to 150° F. and additional n-hexane was added to compensate for evaporation losses thereof, the additional amount of n-hexane being sufficient to replenish that evaporated. Thereafter the contents of the kettle were heated to 160–208° F. and n-heptane was added to replenish further evaporation losses of n-hexane. Thereafter, the contents of the kettle was heated to 200° F. and then cooled to 185° F., the latter temperature being held for 40 minutes. Investigation of the contents of the kettle showed that the residual product had sufficiently dissolved. The contents of the kettle (having a volume of 21½ gals.) was then cooled to 50° F. The residual asphaltic product was then sulfonated by adding approximately 27 lbs. of Sulfan, a commercially prepared liquid $SO_3$. During this sulfonation, refrigerant at about 40° F. was run through the kettle jacket and the temperature of the kettle contents was maintained at 50–72° F. Following sulfonation, 14 lbs. of flake sodium hydroxide was dissolved in 17 lbs. of water and the resulting aqueous solution was added to the kettle contents at a rate of one quart at a time, the entire addition taking about 20 minutes. During this neutralization, the temperature of the kettle contents rose to 122° F. During the sulfonation and neutralization steps, the contents of the kettle were continuously circulated by a pump from the bottom of the kettle back into the top thereof.

The resulting neutralized sulfonated asphalt reaction mixture was transferred to a 30 gal. drum, the latter being placed in a hot water vat and the solvent evaporated therefrom. The resulting solid sodium sulfonated asphalt was then transferred to a vacuum oven and dried overnight. The product recovery amounted to about 70–72 lbs. and was further dried and ground.

Three equal portions of the aforementioned sodium sulfonated asphalt were then fused in the following manner. In one run, designated "A," 222 gms. of the sulfonated asphalt were admixed in a Waring Blendor with 80 gms. of sodium hydroxide, and the resulting dry blend was then admixed with 100 ml. of water as to completely wet the mixture. In another run, designated "B," 222 gms. of the sulfonated asphalt were admixed with 120 gms. of sodium hydroxide in a Waring Blendor and the resulting dry blend was further admixed with 100 ml. of water so as to completely wet and dry blend. In the third run, designated "C," 222 gms. of the sulfonated asphalt were dry blended with 160 gms. of sodium hydroxide and the resulting blend admixed as before with 100 ml. of water. The three reactant mixtures were then sealed in separte pressure bombs and heated for a period of two hours in an oven at a temperature of 356° F.

After fusion, the contents of the bomb used in run "A" were removed and admixed with 500 ml. of water and the resulting aqueous dispersion heated in order to promote solution of the reaction mixture. After cooling the latter, the pH of the solution was found to be 11.5, and then $CO_2$ was bubbled into the solution until the latter had a pH of 9.9. The resulting aqueous mixture was then heated to dryness on a hot plate and then further dried in a vacuum oven. The resulting dried product was then ground to pass a 16 mesh screen, this product amounting to 302 gms.

The contents of the pressure bomb in run "B" were removed and admixed with 250 ml. of water, the resulting admixture being then heated to promote solution of the reaction mixture. The aqueous solution was then cooled and the pH was found to be 10.7. The aqueous solution was then evaporated to dryness on a hot plate and the residue was further dried in a vacuum oven. The resulting dried product was ground to pass a 16 mesh screen and amounted to 330 gms.

The contents of the third pressure bomb used in run "C" were also admixed with 250 ml. of water and the resulting aqueous mixture heated in order to promote solution. The solution was cooled and found to have a pH of 10.8. Following evaporation to dryness, the product was ground to pass a 60 mesh screen and amounted to 371 gms. recovered.

Water-base drilling fluids containing the sodium derivative of hydroxylated asphalt products of runs "A," "B" and "C" were then prepared and compared with similar drilling fluids containing the unreacted or original sulfonated asphalts starting material. In comparing the drilling fluid properties of these two different types of drilling fluids, the concentrations of the drilling fluids containing the hydroxylated asphalt material were such as to be equivalent to those drilling fluids containing the original sulfonated asphalt, this equivalence being set forth in Table II.

Table II

| Hydroxylated Asphalt | Equivalent Amount of Sulfonated Asphalt | Adjusted Amount of Hydroxylated Asphalt |
| --- | --- | --- |
| Run A | 10 | 13.6 |
|  | 20 | 27.2 |
|  | 30 | 40.8 |
| Run B | 10 | 14.9 |
|  | 20 | 29.7 |
|  | 30 | 44.6 |
| Run C | 10 | 16.7 |
|  | 20 | 33.4 |
|  | 30 | 50.1 |

The API Code No. 29 drilling fluid properties of these drilling fluids were determined on unaged and aged drilling fluid samples, the excellent water loss control values at various temperatures, particularly with aged samples, being set forth in Table III.

Table III

|  | Drilling Fluid Samples | | | |
| --- | --- | --- | --- | --- |
|  | 1 | 2 | 3 | 4 |
| Drilling Fluid Components: | | | | |
| Sulfonated asphalt, gms | 30 | 0 | 0 | 0 |
| Hydroxylated asphalt "A," gms | 0 | 40.8 | 0 | 0 |
| Hydroxylated asphalt "B," gms | 0 | 0 | 44.6 | 0 |
| Hydroxylated asphalt "C," gms | 0 | 0 | 0 | 50.1 |
| Water, ml | 170 | 170 | 170 | 170 |
| A.P.I. Properties, Unaged Samples: | | | | |
| Water loss at rm. temp., ml | 4.4 | 13.3 | 7.8 | 5.2 |
| Water loss at 185° F., ml | 4.8 | 12.6 | 60 | 18.8 |
| Water loss at 250° F., ml | 3.6 | 17.0 | 30 | 50 |
| Water loss at 320° F., ml | 4.4 | 19.4 | 143 | 39.4 |
| A.P.I. Properties, After Aging 3 Days at 320° F.: | | | | |
| Water loss at rm. temp., ml | 5.0 | 4.0 | 4.8 | 3.7 |
| Water loss at 185° F., ml | 22.8 | 13.0 | 13.6 | 10.8 |
| Water loss at 250° F., ml | 28.0 | 22.0 | 81 | 25 |
| Water loss at 320° F., ml | 252 | 33.6 | ------ | 210 |

Variations and modifications of this invention will become apparent to those skilled in the art and it is to be understood that the foregoing discussion and examples are illustrative of preferred embodiments of this invention and are not to be construed so as to unduly limit same.

I claim:

1. In a process of drilling a well with well drilling tools, the step of circulating in said well a drilling fluid containing hydroxylated asphalt in an amount sufficient to reduce the filtration rate of said drilling fluid, said hydroxylated asphalt being prepared by fusing sulfonated asphalt with an alkali at a temperature within the range of about 302 to 752° F.

2. In a process of drilling a well with well drilling tools, the improvement comprising circulating through said well, during said drilling, a drilling fluid comprising a fluid medium and hydroxylated asphalt suspended therein in an amount sufficient to reduce the filtaration rate of said drilling fluid, said hydroxylated asphalt being in the form of an alkali metal salt prepared by sulfonating asphalt, neutralizing the resulting sulfonic acids, and fusing the resulting sulfonated asphalt with an alkali at temperatures in the range of about 302 to 752° F.

3. The method according to claim 2 wherein said hydroxylated asphalt is in the form of the sodium salt.

4. The method according to claim 2 wherein said asphalt is a cracke asphalt.

5. The method according to claim 2 wherein said asphalt is a pentane insoluble fraction of a cracked asphalt.

6. The method according to claim 2 wherein said asphalt is a refinery residuum.

7. The method according to claim 2 wherein said asphalt is a blown asphalt.

8. The process according to claim 2 wherein the amount of said hydroxylated asphalt employed is in the range from about 0.1 to about 10 parts per barrel of said drilling fluid.

9. A drilling fluid comprising a fluid medium and hydroxylated asphalt suspended therein, said hydroxylated asphalt being prepared by fusing sulfonated asphalt with an alkali at a temperature within the range of about 302 to 752° F.

10. A drilling fluid comprising a fluid medium and a hydroxylated asphalt in the form of an alkali metal salt, said hydroxylated asphalt being present in an amount sufficient to reduce the filtration loss of said drilling fluid, said hydroxylated asphalt being prepared by fusing sulfonated asphalt with an alkali at a temperature within the range of about 302 to 752° F.

11. The drilling fluid according to claim 10 wherein said hydroxylated asphalt is in the form of a sodium salt.

12. The drilling fluid according to claim 10 wherein said hydroxylated asphalt is in the form of a potassium salt.

13. The drilling fluid according to claim 10 wherein the amount of said hydroxylated asphalt is in the range from about 0.1 to about 10 parts per barrel of said drilling fluid.

14. An aqueous base drilling fluid comprising water and hydroxylated asphalt in the form of an alkali metal salt, said hydroxylated asphalt being present in an amount sufficient to reduce the filtration loss of said drilling fluid, said hydroxylated asphalt being prepared by fusing sulfonated asphalt with an alkali at a temperature within the range of about 302 to 752° F.

15. An oil-containing drilling fluid comprising oil and hydroxylated asphalt in the form of an alkali metal salt, said hydroxylated asphalt being present in an amount sufficient to reduce the filtration loss of said drilling fluid, said hydroxylated asphalt being prepared by fusing sulfonated asphalt with an alkali at a temperature within the range of about 302 to 752° F.

16. An oil-in-water emulsion drilling fluid comprising water, oil, and hydroxylated asphalt in the form of an alkali metal salt, said hydroxylated asphalt being present in an amount sufficient to reduce the filtration loss of said drilling fluid, said hydroxylated asphalt being prepared by fusing sulfonated asphalt with an alkali at a temperature within the range of about 302 to 752° F.

17. A water-in-oil emulsion drilling fluid comprising oil, water and hydroxylated asphalt in the form of an alkali metal salt, said hydroxylated asphalt being present in an amount sufficient to reduce the filtration loss of said drilling fluid, said hydroxylated asphalt being prepared by fusing sulfonated asphalt with an alkali at a temperature within the range of about 302 to 752° F.

18. A method of preparing hydroxylated asphalt, which method comprises sulfonating asphalt with a sulfonating agent, neutralizing the resulting sulfonic acids, and fusing the resulting sulfonated asphalt with an alkali at a temperature in the range of about 302 to 752° F.

19. Hydroxylated asphalt prepared according to the method of claim 18.

References Cited in the file of this patent

UNITED STATES PATENTS

| | | |
|---|---|---|
| 2,018,792 | Kern | Oct. 29, 1935 |
| 2,223,027 | Dawson et al. | Nov. 26, 1940 |
| 2,241,255 | Garrison | May 6, 1941 |
| 2,451,996 | Tyrer | Oct. 19, 1948 |
| 2,748,057 | Goren | May 29, 1956 |
| 2,773,031 | Tailleur | Dec. 4, 1956 |
| 2,885,336 | Goren et al. | May 5, 1959 |